United States Patent
Royyuru et al.

(10) Patent No.: US 9,818,098 B2
(45) Date of Patent: Nov. 14, 2017

(54) SYSTEMS AND METHODS FOR FACILITATING PAYMENTS VIA A PEER-TO-PEER PROTOCOL

(71) Applicant: First Data Corporation, Greenwood Village, CO (US)

(72) Inventors: Vijay Kumar Royyuru, Norristown, PA (US); Dominic John Morea, Marietta, GA (US); Peter Allen Donat, Palo Alto, CA (US)

(73) Assignee: First Data Corporation, Greenwood Village, CO (US)

( * ) Notice: Subject to any disclaimer, the term of this patent is extended or adjusted under 35 U.S.C. 154(b) by 11 days.

(21) Appl. No.: 13/801,591

(22) Filed: Mar. 13, 2013

(65) Prior Publication Data

US 2013/0254052 A1    Sep. 26, 2013

Related U.S. Application Data

(60) Provisional application No. 61/613,236, filed on Mar. 20, 2012.

(51) Int. Cl.
   *G06Q 20/22*    (2012.01)
   *G06Q 20/32*    (2012.01)
   (Continued)

(52) U.S. Cl.
   CPC .......... *G06Q 20/223* (2013.01); *G06Q 20/12* (2013.01); *G06Q 20/20* (2013.01); *G06Q 20/3278* (2013.01); *G06Q 40/00* (2013.01)

(58) Field of Classification Search
   CPC .... G06Q 20/3278; G06Q 20/12; G06Q 40/00; G06Q 30/06; G06Q 20/10; G06Q 20/385;
   (Continued)

(56) References Cited

U.S. PATENT DOCUMENTS 5,950,176 A  *  9/1999  Keiser et al. ............... 705/36 R
8,406,809 B2 *  3/2013  Florek et al. ................ 455/558
(Continued)

FOREIGN PATENT DOCUMENTS

WO    WO 2004/049273 A1 *  6/2004  ............. G06F 17/60
WO    WO 2013/076436 A1 *  5/2013  ............. G06Q 20/34

OTHER PUBLICATIONS

Kortuem, G. et al. (2001). When peer-to-peer comes face to face: collaborative peer-to-peer computing in mobile ad hoc networks. First Int'l conference on peer-to-peer computing (P2P'01).*

(Continued)

*Primary Examiner* — Peter L Ludwig
(74) *Attorney, Agent, or Firm* — Eversheds Sutherland (US) LLP

(57) ABSTRACT

This disclosure describes systems and methods related to facilitating payments via a peer-to-peer protocol. Tokenized information associated with a payment transaction may be obtained. Establishment of a peer-to-peer communications session with a payment recipient device may be facilitated. The tokenized information to the recipient device via the established peer-to-peer communications session may be communicated in order to facilitate completion of the payment transaction.

14 Claims, 3 Drawing Sheets

(51) Int. Cl.
*G06Q 20/12* (2012.01)
*G06Q 40/00* (2012.01)
*G06Q 20/20* (2012.01)

(58) Field of Classification Search
CPC ...... G06Q 20/36; G06Q 20/223; G06Q 20/04; G06Q 20/0855; G06Q 20/0416; G06Q 30/0253; G06Q 20/22; G06Q 20/28; G06Q 30/04; G06Q 20/06; G06Q 20/105
USPC .......................................................... 705/77
See application file for complete search history.

(56) References Cited

U.S. PATENT DOCUMENTS

| | | | | |
|---|---|---|---|---|
| 8,630,906 | B2* | 1/2014 | Fisher | 705/16 |
| 8,706,588 | B1* | 4/2014 | Zhu | 705/35 |
| 2002/0062310 | A1* | 5/2002 | Marmor et al. | 707/3 |
| 2004/0064568 | A1* | 4/2004 | Arora et al. | 709/228 |
| 2004/0181487 | A1* | 9/2004 | Hanson | 705/52 |
| 2005/0114262 | A1* | 5/2005 | Howard et al. | 705/40 |
| 2007/0174116 | A1* | 7/2007 | Keith | G06Q 30/02 705/14.23 |
| 2007/0255662 | A1* | 11/2007 | Tumminaro | 705/79 |
| 2007/0291915 | A1* | 12/2007 | Tseitlin et al. | 379/114.04 |
| 2009/0187488 | A1* | 7/2009 | Shamilian | 705/16 |
| 2009/0265544 | A1* | 10/2009 | Moona et al. | 713/156 |
| 2010/0042841 | A1* | 2/2010 | King et al. | 713/171 |
| 2011/0078077 | A1* | 3/2011 | Hirson | 705/40 |
| 2011/0145148 | A1* | 6/2011 | Hammad | 705/44 |
| 2011/0196796 | A1* | 8/2011 | Florek et al. | 705/64 |
| 2011/0269423 | A1* | 11/2011 | Schell et al. | 455/411 |
| 2012/0124394 | A1* | 5/2012 | Brudnicki et al. | 713/193 |
| 2012/0124659 | A1* | 5/2012 | Craft et al. | 726/9 |
| 2012/0143752 | A1* | 6/2012 | Wong et al. | 705/41 |
| 2012/0150669 | A1* | 6/2012 | Langley et al. | 705/16 |
| 2013/0041830 | A1* | 2/2013 | Singh et al. | 705/65 |
| 2013/0073404 | A1* | 3/2013 | Narendra et al. | 705/17 |
| 2013/0086375 | A1* | 4/2013 | Lyne et al. | 713/153 |
| 2013/0198061 | A1* | 8/2013 | Dheer et al. | 705/39 |
| 2013/0275308 | A1* | 10/2013 | Paraskeva et al. | 705/71 |
| 2013/0282502 | A1* | 10/2013 | Jooste | 705/21 |
| 2013/0291084 | A1* | 10/2013 | Amiel et al. | 726/9 |
| 2014/0040139 | A1* | 2/2014 | Brudnicki et al. | 705/44 |

OTHER PUBLICATIONS

Daras, P. (2003). A novel peer-to-peer payment protocol. IEEE.*
Yen, S-M et al. (2010). A new peer-t0-peer micropayment protocol based on transferable debt token.*
Home, B. et al. (2001). Escrow services and incentives in peer-to-peer networks. EC'01.*
Nakamoto, S. (archived back to Jul. 4, 2010). Bitcoin: A peer-to-peer electronic cash system. www.bitcoin.org.*
Yi-chun, Liu (2007). An optimistic fair peer-to-peer payment system. 2007 INt'l conference on management science & engineering 14$^{th}$.*
SecureElementManager (BlackBerry JDE 7.1.0 API Reference) (date: Aug. 16, 2011) (hereinafter "SEManager").*
Liu, Y. & Liang, Y. (Sep. 2011). A Fair Payment Protocol for Cascading P2P Transaction. Journal of Networks, vol. 6, No. 9 (hereinafter "Liu").*
SIMalliance (Dec. 2011). Secure Authentication for Mobile Internet Services. Critical Considerations.*

* cited by examiner

SYSTEMS AND METHODS FOR FACILITATING PAYMENTS VIA A PEER-TO-PEER PROTOCOL

RELATED APPLICATIONS

This application claims priority to U.S. Provisional Patent Application No. 61/613,236, entitled "Systems and Methods for Facilitating Payments via a Peer to Peer Protocol," filed on Mar. 20, 2012, the contents of which are incorporated by reference herein in their entirety.

TECHNICAL FIELD

Embodiments of the disclosure relate generally to payment transactions, and more specifically to the use of a peer-to-peer protocol to facilitate communication of transaction data.

BACKGROUND

Payment transactions typically involve the provision of transaction information from a consumer or payer device to a payee device. For example, a purchase transaction at a point of sale ("POS") typically involves the provision of payment information from a consumer payment device to a merchant terminal. Increasingly, mobile devices and other contactless payment devices are being employed in conjunction with payment transactions. Typically, a contactless payment device includes near field communication ("NFC") functionality that facilitates the communication of data from the payment device to a recipient NFC reader device. In accordance with existing International Standards Organization ("ISO") standards, contactless payment devices typically utilize a card emulation mode to communicate data to a reader. In other words, the contactless payment device operates as a passive device that is invoked and read by a reader.

More recently, secure elements or secure chips have been incorporated into mobile devices in order to facilitate secure containment of payment credentials. A secure element is typically separate from other mobile device chips, such as a chip that provides NFC functionality. Additionally, it is possible that certain entities, such as mobile device manufacturers, mobile device carriers, secure element owners, and/or mobile device operating system vendors, will restrict access to secure elements and control the use of application programming interfaces ("API's") that interface with the secure elements. Additionally, the use of NFC functionality in a card emulation mode may also be restricted. Accordingly, there is an opportunity for improved systems and methods for communicating payment and/or other transaction-related information between a mobile device (or other contactless consumer device) and a recipient device.

BRIEF DESCRIPTION OF THE DISCLOSURE

Certain embodiments of the disclosure can address some or all of the above needs. Certain embodiments of the disclosure can provide systems and methods for facilitating payments via a peer-to-peer protocol. In one embodiment, one or more computer-readable media may be provided. The one or more computer-readable media may be configured to store computer-executable instructions. When executed by one or more processors, the computer-executable instructions may configure the one or more processors to obtain tokenized information associated with a payment transaction. Establishment of a peer-to-peer communications session with a payment recipient device may be facilitated. The computer-executable instructions may configure the one or more processors to communicate the tokenized information to the payment recipient device via the established peer-to-peer communications session in order to facilitate completion of the payment transaction.

In one aspect of an embodiment, the tokenized information may be obtained from (i) a secure element or (ii) a tokenization service provider.

In one aspect of an embodiment, the peer-to-peer communications session may utilize a peer-to-peer protocol.

In one aspect of an embodiment, the computer-executable instructions may configure the one or more processors to verify an identity of a consumer associated with the payment transaction.

In one aspect of an embodiment, the tokenized information may comprise at least one of (i) a payment credential, (ii) payment-related data, or (iii) information associated with at least one value added service (VAS).

In one aspect of an embodiment, the payment-related data may further comprise at least one of (i) identification information for a payment account to be utilized in association with the payment transaction; (ii) consumer identification information to identify the payment account; or (iii) consumer device identification information to identify the payment account.

In one aspect of an embodiment, the information associated with the at least one VAS may further comprise at least one of (i) data associated with a pre-transaction VAS; or (ii) data associated with a post-transaction VAS.

In one aspect of an embodiment, the computer-executable instructions may configure the one or more processors to evaluate a consumer device location based at least in part on consumer transaction processing preferences. In one aspect of an embodiment, the computer-executable instructions may configure the one or more processors to determine whether the payment transaction can be completed based at least in part on the evaluation. In response to determining the payment transaction can be completed, the computer-executable instructions may configure the one or more processors to complete the payment transaction. In response to determining the payment transaction cannot be completed, the computer-executable instructions may configure the one or more processors to abort the payment transaction.

In one aspect of an embodiment, the computer-executable instructions may configure the one or more processors to generate an electronic receipt corresponding to the payment transaction and transmit the electronic receipt to one or more devices based at least in part on consumer preferences.

In one embodiment, a merchant point of sale device may include at least one reader device configured to establish a peer-to-peer communications session with a consumer device and at least one processor. The processor may be configured to receive tokenized information via the established peer-to-peer communications session. The processor may be configured to process the received information in order to determine transaction-related information. The processor may be configured to process a payment transaction utilizing the transaction-related information.

In one aspect of an embodiment, the tokenized information may be de-tokenized by a de-tokenization service provider.

In one aspect of an embodiment, the tokenized information may comprise information associated with at least one value added service (VAS).

In one aspect of an embodiment, the at least one processor may be configured to communicate a VAS request to one or more service provider systems based at least in part on the information associated with the at least one VAS. The at least one processor may be configured to receive a response to the VAS request from the one or more service provider systems. The at least one processor may be configured to process the payment transaction based at least in part on the received response to the VAS request.

In one embodiment, a computer-implemented method may include a consumer device comprising at least one processor obtaining tokenized information associated with a payment transaction. The computer-implemented method may include facilitating establishment of a peer-to-peer communications session with a payment recipient device. The computer-implemented method may include communicating the tokenized information to the payment recipient device via the established peer-to-peer communications session in order to facilitate completion of the payment transaction.

In one aspect of an embodiment, the tokenized information may be obtained from one of (i) a secure element or (ii) a tokenization service provider.

In one aspect of an embodiment, the peer-to-peer communications session may utilize a peer-to-peer protocol.

In one aspect of an embodiment, the computer-implemented method may include verifying an identity of a consumer associated with the payment transaction.

In one aspect of an embodiment, the tokenized information may comprise at least one of (i) a payment credential, (ii) payment-related data, or (iii) information associated with at least one value added service (VAS).

In one aspect of an embodiment, the payment-related data may further comprise at least one of (i) identification information for a payment account to be utilized in association with the payment transaction; (ii) consumer identification information to identify the payment account; or (iii) consumer device identification information to identify the payment account.

In one aspect of an embodiment, the information associated with the at least one VAS may further comprise at least one of (i) data associated with a pre-transaction VAS; or (ii) data associated with a post-transaction VAS.

In one aspect of an embodiment, the computer-implemented method may include evaluating a consumer device location based at least in part on consumer transaction processing preferences. In one aspect of an embodiment, the computer-implemented method may include determining whether the payment transaction can be completed based at least in part on the evaluation. In response to determining the payment transaction can be completed, the computer-implemented method may include completing the payment transaction. In response to determining the payment transaction cannot be completed, the computer-implemented method may include aborting the payment transaction.

In one aspect of an embodiment, the computer-implemented method may include generating an electronic receipt corresponding to the payment transaction and transmitting the electronic receipt to one or more devices based at least in part on consumer preferences.

BRIEF DESCRIPTION OF THE FIGURES

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
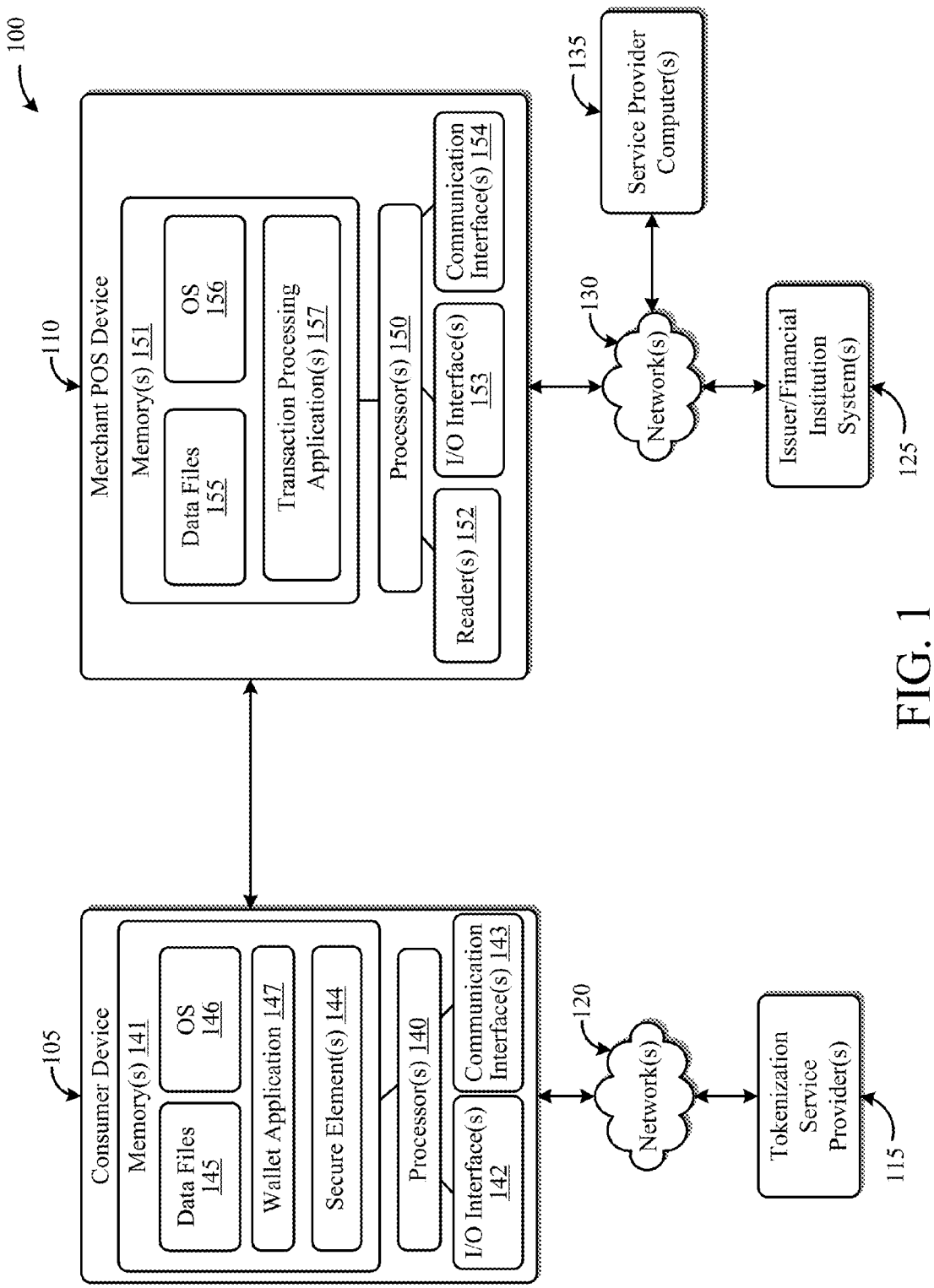
FIG. 1 illustrates a block diagram of an example system that may be utilized in accordance with various embodiments of the disclosure to facilitate communication of transaction-related information from a consumer device to a recipient device.

Various embodiments of the disclosure are directed to systems and methods for facilitating communication of payment and/or other transaction-related information from a consumer device (e.g., a mobile device, a contactless payment device, etc.) to a recipient device (e.g., a merchant point of sale ("POS") device, another mobile device, etc.). In various embodiments, a peer-to-peer communications protocol, such as an NFC peer-to-peer protocol, may be utilized to communicate transaction-related information from the consumer device to the recipient device. For example, a peer-to-peer protocol in accordance with ISO standard 18092 may be utilized.

In certain embodiments, an NFC-enabled component of the consumer device (e.g., an NFC chip, etc.) that invokes the peer-to-peer protocol may store information in a generally available memory associated with the consumer device. In other words, the NFC-enabled component typically will not direct storage of information on a secure element of the consumer device. As a result, in certain embodiments, the NFC-enabled component will not statically store transaction-related information, such as payment information and/or information associated with one or more value added services ("VAS"). Instead, transaction-related information may be tokenized from an information source and delivered to the NFC-enabled component. The tokenized information (e.g., a credential for account information, etc.) may then be communicated to a recipient device utilizing a peer-to-peer protocol.

As desired in various embodiments, tokenized transaction-related information may be received from a wide variety of different sources. For example, in certain embodiments, tokenized information may be received from one or more tokenization service providers (e.g., a network level or cloud server, etc.). In other embodiments, in the event that access to a secure element is available, tokenized information may be received from a secure element. A wide variety of suitable information may be included in the tokenized data including, but not limited to, payment account information, payment credentials, and/or information associated with VAS (e.g., information associated with the application of coupons, information associated with the award and/or redemption of loyalty rewards, information associated with receipt generation and/or delivery services, information associated with product registration services, etc.). Once tokenized information is received, the tokenized information may be conveyed to a recipient device utilizing a peer-topeer protocol. The tokenized information may then be processed by the recipient device to complete a transaction.

Embodiments of the disclosure now will be described more fully hereinafter with reference to the accompanying drawings, in which certain embodiments are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

FIG. 1 represents a block diagram of an example system 100 that may be utilized in accordance with various embodiments of the disclosure to facilitate communication of transaction-related information from a consumer device to a recipient device. In certain embodiments, the system 100 may facilitate the communication of transaction-related information from a consumer device to a recipient device via a peer-to-peer protocol, such as the peer-to-peer protocol described in ISO 18092. As shown in FIG. 1, the system 100 may include a consumer device 105 and one or more merchant POS devices 110 (e.g., merchant POS terminals, merchant registers, merchant computers, etc.). Although a merchant POS device 110 is illustrated as a recipient device, other types of recipient devices may be utilized, such as a mobile device or a payee, etc. As desired, the system 100 may additionally include a wide variety of other entities associated with payment transactions, such as one or more tokenization service providers 115 in communication with the customer device 105 via one or more first networks 120 (e.g., a cellular network, the Internet, etc.) and/or one or more issuer/financial institution systems 125 in communication with the merchant POS device 110 (and optionally the consumer device 105) via one or more second networks 130 (e.g., a transaction network, etc.), which may be the same or different than the first networks 120. As shown, one or more service provider computers 135 (e.g., service provider computers that perform VAS functionality, etc.), which may be the same or different than the tokenization service providers 115, which may also be in communication with the merchant POS device 110 (and optionally the consumer device) via the second networks 130.

With reference to FIG. 1, any number of consumer devices 105 may be provided. Examples of suitable consumer devices 105 include, but are not limited to, mobile devices (e.g., mobile phones, smart phones, etc.) and other contactless transaction devices that support peer-to-peer communications functionality. For example, a consumer device 105 may include an NFC chip or other NFC component that facilitates the communication of transaction-related data to the merchant POS device 110 (or other recipient device) in accordance with ISO 18092 or other peer-to-peer protocol. In other embodiments, the consumer device 105 may utilize a peer-to-peer protocol associated with other contactless communications functionality, such as RF functionality, to communicate transaction-related information.

As desired, a consumer device 105 may include any number of processor-driven devices, including but not limited to, a mobile computer, an application-specific circuit, a minicomputer, a microcontroller, and/or any other processor-based device. A consumer device 105 may utilize one or more processors 140 to execute computer-readable instructions that facilitate the general operation of the consumer device 105 (e.g., call functionality, etc.) and/or the completion of a payment transaction. As a result of executing these computer-readable instructions, a special purpose computer or particular machine may be formed that facilitates the communication of transaction-related information (e.g., tokenized payment credentials, tokenized VAS information, etc.) to a recipient device via a peer-to-peer protocol.

In addition to having one or more processors 140, the consumer device 105 may further include and/or be associated with one or more memory devices 141 (generally referred to as memory 141), input/output ("I/O") interface(s) 142, and/or communication and/or network interface(s) 143. The memory 141 may be any computer-readable medium, coupled to the processor(s) 140, such as random access memory ("RAM"), read-only memory ("ROM"), and/or removable storage devices. The memory 141 may store a wide variety of data files 145 and/or various program modules, such as an operating system ("OS") 146 and/or one or more wallet applications 147. In certain embodiments, a consumer device 105 may include one or more secure elements 144 configured to securely store and/or access information, such as payment applications, payment account information, and/or other transaction-related information. For example, one or more secure elements 144 may be configured to store payment data or payment information, such as information that may be utilized to generate tokenized information to be communicated to a recipient device. In other embodiments, one or more tokenization service providers 115 may facilitate the generation of tokenized information. The secure elements 144 may be stored in the memory 141 and/or included as a separate component of the consumer device 105. For example, a secure element 144 may be a separate chip that is configured to communicate with primary computing functionality for the consumer device 105, such as a primary chip that includes NFC communications functionality. As desired, one or more of the transaction applications may be stored on a secure element 144. These transaction applications may be invoked by other components of the consumer device 105, such as the wallet application 147.

The data files 145 may include any suitable data that facilitates the operation of the consumer device 105 and/or interaction of the consumer device 105 with one or more other components of the system 100. For example, the data files 145 may include information associated with communicating with and/or invoking a tokenization service provider 115, information associated with accessing the secure elements 144, information associated with invoking a wallet application 147, information associated with outputting transaction-related information via a peer-to-peer protocol, etc. The OS 146 may be a suitable module that facilitates the general operation of the consumer device 105, as well as the execution of other program modules. For example, the OS 146 may be, but is not limited to, a suitable mobile OS or a specially designed operating system. As desired, the consumer device 105 may additionally include one or more communication modules that facilitate interaction with other devices, such as merchant POS devices equipped with contactless readers and/or other communications functionality. For example, a suitable near field communication module may be included in the consumer device 105.

The wallet application 147 may include one or more suitable software modules and/or applications configured to collect transaction-related information and/or to direct communication of transaction-related information to a recipient device. For example, the wallet application 147 may be configured to facilitate the collection of tokenized data and/or the delivery of tokenized data to a recipient device via a peer-to-peer protocol. As desired in certain embodiments, the wallet application 147 may invoke one or more tokenization service providers 115 in order to receive tokenized credential and/or VAS data that may be delivered to a recipient device. In other embodiments, the wallet application 147 may invoke any number of suitable transaction applications, such as transaction applications stored on the secure elements 144, in order to receive tokenized information. The transaction applications may be, for example, applications associated with various payment accounts and/or payment account issuers.

According to an example embodiment, the wallet application 147 may be invoked in association with a proposed payment transaction. For example, a consumer may invoke the wallet application 147 in order to request completion of a transaction. As another example, a recipient device (or other system) may invoke or request the invocation of the wallet application 147 in association with a proposed payment transaction. Once invoked, the wallet application 147 may initiate a transaction in which transaction-related information (e.g., payment credentials, payment account information, VAS information, etc.) will be communicated to a recipient device, such as the merchant POS device 110.

In certain embodiments, the wallet application 147 may obtain tokenized transaction information for communication to the merchant POS device 110. In certain embodiments, the tokenized information may include a tokenized payment credential (e.g., information associated with a payment account, track one and track two data associated with a payment device, etc.) and/or tokenized VAS information. Additionally, a wide variety of suitable methods and/or techniques may be utilized to tokenize information, such as key pair encryption, asymmetric key encryption, the generation of a transaction-specific value, and/or the generation of a credential and/or representative value associated with stored payment account and/or VAS information. In certain embodiments, tokenized information may also have a relatively limited lifespan and/or be associated with any number of other security techniques (e.g., hashing, check sums, etc.).

According to an aspect of the disclosure, the wallet application 147 may obtain the tokenized information from a wide variety of suitable sources. For example, in certain embodiments, the wallet application 147 may communicate identification information for the consumer, consumer device 105, and/or a desired payment account or method of payment (e.g., an account identifier, etc.) to a tokenization service provider 115 along with a request for tokenization information. In response to the request, the tokenization service provider 115 may generate tokenization information that is returned to the consumer device 105. In other embodiments, the wallet application 147 may request and receive tokenization information from a secure element 144 and/or an associated transaction application stored by the secure element.

Once tokenized information has been received, the wallet application 147 may direct communication of the tokenized information to the mobile POS device 110 (or other recipient device) in association with a proposed payment transaction. For example, the wallet application 147 may direct a suitable NFC communications interface to communicate the tokenization information to the mobile POS device 110 via a peer-to-peer protocol, such as the peer-to-peer mode of the ISO 18092 standard. The ISO 18092 standard provides for three modes of operation: a card emulation mode that causes a consumer device to function as a passive device that is powered and read by a reader signal or active device; a reader-writer mode in which the consumer device can function as either an active reader device or a passive device to be read; and a peer-to-peer mode that facilitates two way communication in which both devices are active. As a result of utilizing a peer-to-peer mode, tokenized transaction-related information may be utilized to facilitate a transaction even if access to a secure element and/or use of a card emulation or reader/writer mode is restricted or limited.

As desired in various embodiments, a wide variety of other information may be communicated to the merchant POS device 110 in addition to the tokenized information. Examples of other types of information include, but are not limited to, consumer identification information, consumer device identification information, and/or certain types of VAS information. Once the information is communicated to the merchant POS device 110, the merchant POS device 110 may utilize at least a portion of the information to facilitate completion of a payment transaction. A few examples of the operations that may be performed by the wallet application 147 and/or the consumer device 105 are described in greater detail below with reference to FIG. 2.

The one or more I/O interfaces 142 may facilitate communication between the consumer device 105 and one or more input/output devices; for example, one or more user interface devices, such as a display, a keypad, a touch screen display, a microphone, a speaker, etc., that facilitate user interaction with the consumer device 105. The one or more network and/or communication interfaces 143 may facilitate connection of the consumer device 105 to one or more suitable networks, for example, the network(s) 120 illustrated in FIG. 1. In this regard, the consumer device 105 may receive and/or communicate information to other components of the system 100. For example, the consumer device 105 may communicate with one or more tokenization service providers 115 in order to obtain tokenized information.

With continued reference to FIG. 1, any number of merchant POS devices 110 may be provided. A merchant POS device 110 may be a suitable device that facilitates the completion of payment transactions. In operation, the merchant POS device 110 may utilize one or more processors 150 to execute computer-readable instructions that facilitate the collection of transaction-related information (e.g., tokenized information, information associated with items to be purchased, transaction amounts, etc.) and/or the generation and/or output of transaction-related requests (e.g., transaction authorization requests, value added service ("VAS") requests, etc.). As a result of executing these computer-readable instructions, a special purpose computer or particular machine may be formed that facilitates the completion of POS payment transactions.

In addition to having one or more processors 150, the merchant POS device 110 may further include and/or be associated with one or more memory devices 151 (generally referred to as memory 151), readers 152 or reader devices, input/output ("I/O") interface(s) 153, and/or network interface(s) 154. The memory 151 may be any computer-readable medium, coupled to the processor(s) 150, such as random access memory ("RAM"), read-only memory ("ROM"), and/or removable storage devices. The memory 151 may store a wide variety of data files 155 and/or various program modules, such as an operating system ("OS") 156 and/or one or more transaction processing applications or modules 157. The data files 155 may include any suitable data that facilitates the operation of the merchant POS device 110 and/or interaction of the merchant POS device 110 with one or more other components (e.g., one or more issuer systems 125, one or more service provider computers 135, etc.) of the system 100. For example, the data files 155 may include information associated with the readers 152, information that facilitates the processing of received tokenized and/or other transaction-related information, acquiring platform information, service provider information, information associated with the generation of proposed transactions and/or VAS requests, information associated with available VAS, and/or routing information for proposed transactions.

The OS 156 may be a suitable module that facilitates the general operation of the merchant POS device 110, as well as the execution of other program modules. For example, the OS 156 may be, but is not limited to, Microsoft Windows®, Apple OSX™, Unix, a mainframe computer operating system (e.g., IBM z/OS, MVS, OS/390, etc.), or a specially designed operating system. The transaction processing applications or modules 157 may include any number of suitable software modules and/or applications that facilitate the receipt of transaction information (e.g., tokenized information, other information received from a consumer device 105, a purchase amount, information associated with purchased products, etc.), the generation of a proposed transaction, and/or the output of the proposed transaction. In certain embodiments, the transaction processing applications 157 may additionally facilitate the identification of information associated with a wide variety of value added services and the generation of one or more requests to invoke value added services, such as requests communicated to one or more service provider computers 135.

In certain embodiments, the transaction processing application 157 may be configured to receive information from the one or more readers 152 and process the received information in association with a payment transaction. For example, the transaction processing application 157 may receive tokenized information collected from a consumer device 105 via peer-to-peer communication. The transaction processing application 157 may then process the received information in order to complete a payment transaction and/or to facilitate any number of VAS associated with the payment transaction. For example, the transaction processing application 157 may communicate tokenized information to a suitable de-tokenization service provider, which may be an issuer system 125 or a service provider computer 135. The de-tokenization service provider may process the tokenized information in order to determine a payment credential and/or other transaction-related information. A wide variety of suitable techniques may be utilized as desired to de-tokenize the tokenized information. For example, key information and/or a wide variety of decryption techniques may be utilized to decrypt tokenized information. As another example, the tokenized information may be utilized to access stored transaction-related information (e.g., payment account information, etc.). In certain embodiments (e.g., embodiments in which an issuer facilitates de-tokenization), the de-tokenization service provider may utilize at least a portion of the received information to approve and/or complete a funds transfer in association with a requested payment transaction. In other embodiments, the de-tokenization service provider may return de-tokenized information (e.g., payment account information, VAS information, etc.) to the merchant POS device 110 for use in completing a payment transaction.

In certain embodiments, the transaction processing application 157 may utilize at least a portion of the transaction-related information and/or received de-tokenization information to provide any number of transaction-related services. For example, the transaction processing application 157 may invoke and/or request (e.g., request a service provider computer, etc.) the invocation of a wide variety of VAS associated with a transaction, such as the application of coupons, the award and/or redemption of loyalty rewards, etc. The transaction processing application 157 may also generate a proposed transaction request that is output for routing and/or delivery to a suitable transaction processor, such as a payment account issuer system 125. In the event that the transaction is authorized, the transaction processing application 157 may invoke and/or request the invocation of a wide variety of VAS following the transaction, such as receipt generation and/or delivery services, product registration services, etc. Indeed, a wide variety of suitable operations may be performed by the transaction processing application 157. A few examples of the operations that may be performed by a transaction processing application 157 and/or the merchant POS device 110 are described in greater detail below with reference to FIG. 3.

With continued reference to the merchant POS device 110, any number of suitable reader devices 152 may be provided. For example, an NFC contactless reader may be utilized, and the NFC reader may facilitate peer-to-peer communications. The one or more I/O interfaces 153 may facilitate communication between the merchant POS device 110 and one or more input/output devices; for example, one or more user interface devices, such as a display, a keypad, a mouse, a pointing device, a control panel, a touch screen display, a remote control, a microphone, a speaker, the reader devices 152, etc., that facilitate user interaction with the merchant POS device 110. The one or more network and/or communication interfaces 154 may facilitate connection of the merchant POS device 110 to one or more suitable networks and/or communication links. In this regard, the merchant POS device 110 may receive and/or communicate information to other components of the system 100, such as the issuer systems 125, the service provider computers 135, and/or other devices and/or systems.

With continued reference to FIG. 1, any number of tokenization service providers 115 may be included in the system 100. A tokenization service provider 115 may facilitate the generation of tokenized information (e.g., a payment credential, a unique transaction value, etc.) for use in a payment transaction. For example, a tokenization service provider 115 may receive a tokenization request from a consumer device 105 via any number of suitable first networks 120, such as a cellular network or the Internet. The tokenization service provider 115 may then process the received request in order to generate or otherwise prepare tokenization information that is returned to the consumer device 105. For example, the tokenization service provider 115 may access payment account information associated with a consumer or payer, and the tokenization service provider 115 may encrypt or encode the payment account information. As another example, the tokenization service provider 115 may identify or determine a representative value of payment account information. A wide variety of other methods and/or techniques may be utilized to generate tokenized information. In certain embodiments, a tokenization service provider 115 may include similar components as those discussed above for the merchant POS device 110. For example, a tokenization service provider 115 may include any number of processors, memories, I/O interfaces, and/or network/communication interfaces.

Additionally, any number of issuer and/or financial institution systems 125 may be provided. An issuer system 125 may facilitate the backend processing of a proposed transaction. For example, an issuer system 125 may facilitate the approval and/or settlement of a proposed transaction. In certain embodiments, a proposed transaction may be routed to an issuer system 125 via a suitable transaction network (e.g., a debit network, a credit network, etc.), and the issuer system 125 may evaluate the proposed transaction. An approval or rejection of the proposed transaction may then be output for communication to a merchant POS device 110. The issuer system 125 may then facilitate the settlement of the proposed transaction. Additionally, as desired, the issuer system 125 may facilitate the de-tokenization of tokenized information. In certain embodiments, an issuer system 125 may include similar components as those discussed above for the merchant POS device 110. For example, an issuer system 125 may include any number of processors, memories, I/O interfaces, and/or network/communication interfaces.

Additionally, any number of service provider computers 135 may be utilized as desired in various embodiments of the disclosure. A service provider computer may provide a wide variety of transaction-related, de-tokenization, and/or value added services ("VAS") in association with transactions, such as coupon redemption services, loyalty services, location-based services, electronic receipt services, product registration services, warranty services, coupon issuance services, and/or the routing of a proposed transaction to an issuer for approval and/or settlement purposes. In certain embodiments, a service provider computer 135 may include similar components as those discussed above for the merchant POS device 110. For example, a service provider computer 135 may include any number of processors, memories, I/O interfaces, and/or network/communication interfaces.

A wide variety of suitable networks and/or communication channels 120, 130 may be utilized in association with embodiments of the disclosure. Certain networks may facilitate communication between remote devices. For example, one or more telecommunication networks, cellular networks, wide area networks (e.g., the Internet) and/or transaction networks (e.g., branded networks (e.g., a VISA network, etc.), debit and/or PIN networks, and/or a wide variety of other suitable transaction networks) may facilitate communication between various components of the system 100. Other networks and connections, such as NFC connections, may facilitate communication between the consumer device 105 and the merchant POS device 110. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Operational Overview

Figure 2:
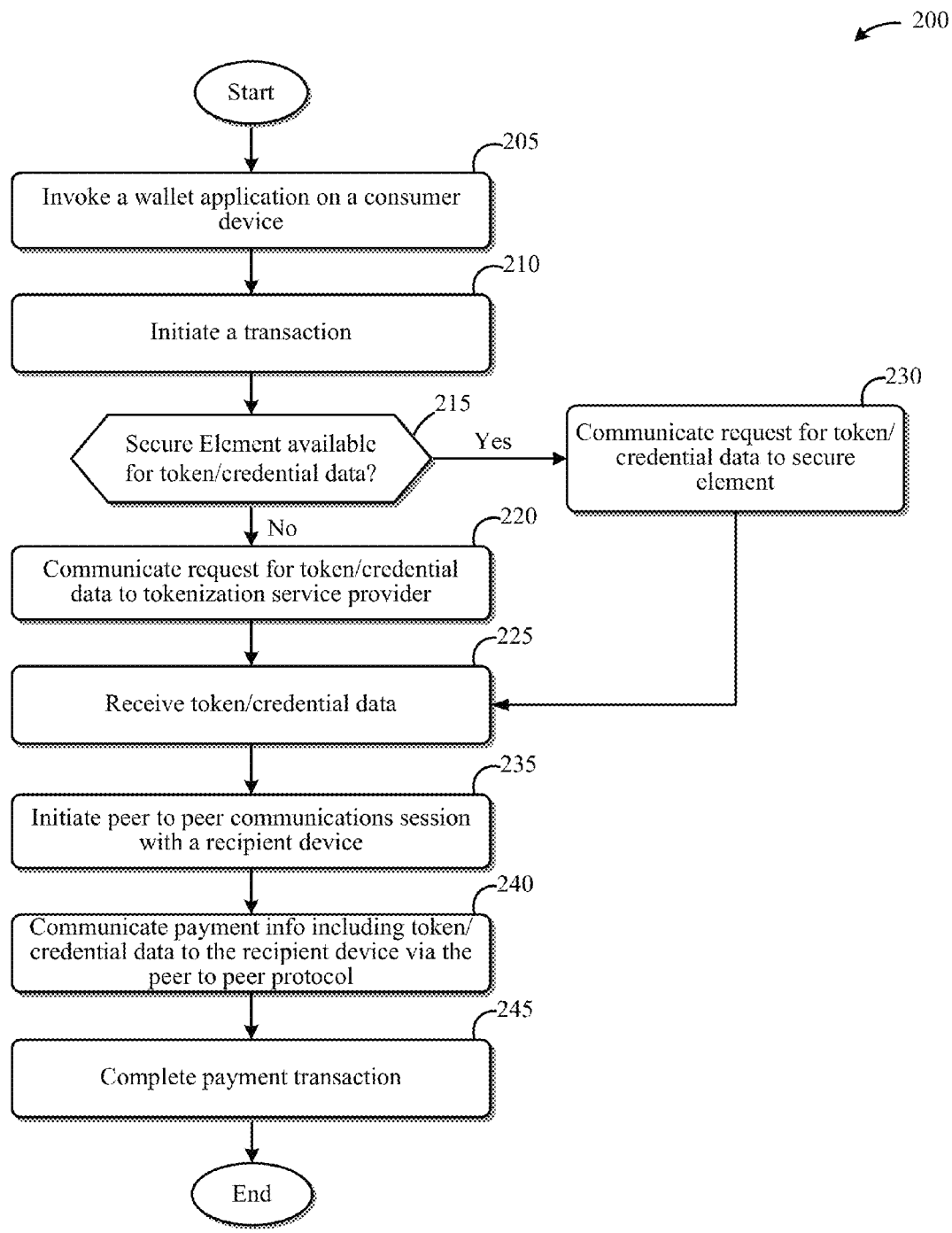
FIGS. 2 and 3 illustrate flow diagrams of example processes for communicating transaction-related information utilizing a peer-to-peer protocol, in accordance with illustrative embodiments of the disclosure.

FIG. 2 illustrates a flow diagram of an example process 200 for communicating transaction-related information from a consumer device to a merchant POS device or other recipient device, according to an example embodiment of the disclosure. In certain embodiments, the operations of the method 200 may be performed by a suitable consumer device, such as the consumer device 105 illustrated in FIG. 1. The method 200 may begin at block 205.

At block 205, a wallet application (or other suitable transaction facilitating application), such as the wallet application 147 illustrated in FIG. 1, may be invoked on the consumer device 105. For example, the wallet application 147 may be invoked by a consumer (e.g., a user of the consumer device 105, etc.) or by another device (e.g., a merchant POS device 110 that initiates a peer-to-peer communications session, etc.). At block 210, the wallet application 147 may be utilized to initiate a transaction or, alternatively, a transaction request may be received from another device.

At block 215, a determination may be made as to whether a secure element 144 is available for preparing token and/or credential data for the transaction. If it is determined at block 215 that a secure element 144 is not available for tokenization services, then operations may continue at block 220, and a request for token/credential data relating to the transaction may be communicated to a suitable tokenization service provider, such as the tokenization service provider 115 illustrated in FIG. 1. The tokenization service provider 115 may identify, generate, and/or determine tokenized information (e.g., a token or credential for the transaction, and the tokenized information may be returned to the consumer device 205. The wallet application may receive the tokenized information at block 225, and operations may then continue at block 235 described below. If it is determined at block 215 that a secure element 144 is available for token and/or credential data, then operations may continue at block 230. At block 230, a request for token/credential data may be communicated by the wallet application 147 to the secure element 144. The secure element 144 may then identify or determine tokenized information and return the tokenized information to the wallet application 147, where it is received at block 225. Operations may then continue at block 235.

At block 235, the wallet application 147 may direct the initiation of a peer-to-peer communications session with a merchant POS device 110 or a suitable reader (e.g., an NFC reader) associated with a merchant POS device 110. In this regard, payment and/or transaction-related information, including the token and/or credential data, may be communicated to the merchant POS device 110 via the peer-to-peer protocol at block 240. In certain embodiments, the token and/or credential data may include or be representative of payment account information and/or information associated with a wide variety of different VAS. Additionally, in certain embodiments, payment data may include an extensible set of tags associated with VAS and/or the performance of VAS. Once the data is communicated to the merchant POS device 110 via the peer-to-peer protocol, operations may continue at block 245, and a payment transaction may be completed. In certain embodiments, the merchant POS device 110 may facilitate completion of the payment transaction. In other embodiments, the merchant POS device 110 and/or any number of other systems (e.g., an issuer system, a service provider system, etc.) may communicate with the consumer device 105 during the completion of a payment transaction. The method 200 may end following block 245.

As mentioned above, a wide variety of different types of information may be communicated by the consumer device 105 to the merchant POS device 110 via a peer-to-peer protocol. This information may include payment-related data and/or a wide variety of VAS data, as well as representative values and/or links to the various data. Payment-related data may include, for example, identification information for a payment account to be utilized in association with a transaction (e.g., an account number, an identifier of an account issuer, etc.), consumer identification information that may be utilized to identify or select a payment account, and/or consumer device identification information (e.g., device identifier, a mobile telephone number, etc.) that may be utilized to identify or select a payment account. VAS data may include information associated with the provision of a wide variety of VAS in association with the transaction. These VAS may be implemented by the merchant POS device 110 and/or by any number of suitable service provider computers directly or indirectly in communication with the merchant POS device 110. A wide variety of different types of VAS may be implemented as desired in various embodiments, and each of the VAS may be associated with information received from the consumer device 105 and/or accessed from a suitable data source on behalf of the consumer. Examples of suitable pre-transaction VAS include, but are not limited to, electronic wallet services, loyalty services, coupon redemption services, location-based mobile services. Examples of suitable post-transaction VAS include, but are not limited to, electronic receipt services, product registration services, product warranty services, coupon and/or offer issuance services, targeted advertisement services, receipt reconciliation with issuer statement services, etc. Various VAS may be invoked prior to the completion of a transaction, during the completion of the transaction, and/or following the completion of the transaction.

An example electronic wallet service, which may alternatively be implemented as a transaction processing service, may facilitate the identification of a payment account to utilize in association with a transaction, as well as the verification of a consumer's identity. A loyalty service may identify an applicable loyalty account of the consumer, such as a loyalty account with the merchant. The loyalty service may then facilitate the issuance and/or redemption of loyalty points and/or loyalty rewards in association with the transaction. A coupon redemption service may compare products being purchased (e.g., UPCs, etc.) with available coupons (e.g., coupons identified from received transaction information, coupons stored at the service provider in association with the consumer, coupons accessed from an external data source, etc.), and the coupon redemption service may identify coupons that may be redeemed. The coupon redemption service may then facilitate the communication of applied coupons to coupon issuers, and the distribution of redeemed coupon revenue to the merchant. A location-based mobile service may perform a wide variety of suitable services based upon received location information (e.g., GPS coordinates, etc.) for a consumer device. For example, a location-based mobile service may evaluate a consumer device location based upon consumer transaction processing preferences, and the location-based service may determine whether the transaction may be completed based at least in part upon the evaluation. For example, a consumer may specify that a consumer device (e.g., a mobile device of a child) can only be used at gas stations and/or grocery stores in order to complete transactions. A location-based service may utilize GPS coordinates for the consumer device to identify a merchant for a proposed transaction, and the location-based service may determine whether a transaction can be approved for the merchant. As another example of a location-based service, a consumer may request different VAS services in different states and/or geographical regions. Indeed, a wide variety of different location-based services may be provided as desired.

An example electronic receipt service may generate electronic receipts for a transaction, and the electronic receipts may be delivered to any number of recipients, such as the merchant POS device 110 and/or the consumer device 105. An example product registration service may automatically complete a product registration application on behalf of the consumer and deliver the registration application to a suitable recipient, such as a manufacturer. As desired, a consumer may specify the types of products (e.g., electronics, appliances, etc.) for which product registration services will be provided. An example product warranty service may identify and store product warranty information on behalf of the consumer. Another example product warranty service may evaluate consumer preferences in order to automatically (or upon prompting) purchase an extended warranty for a purchased product. An example coupon issuance service may identify, based upon, for example, the purchased products and/or historical purchases, one or more coupons to be issued to the consumer (e.g., coupons that may be printed on the back of or otherwise associated with a receipt). Similarly, a targeted advertisement service may identify advertisements and/or promotions to be communicated to the consumer. An example receipt reconciliation service may compare a purchase amount to a subsequently obtained issuer statement (e.g., a credit card statement, a bank statement, etc.) and identify any discrepancies. In other words, an example reconciliation service may conduct an audit of the transaction on behalf of the consumer and/or the merchant.

Figure 3:
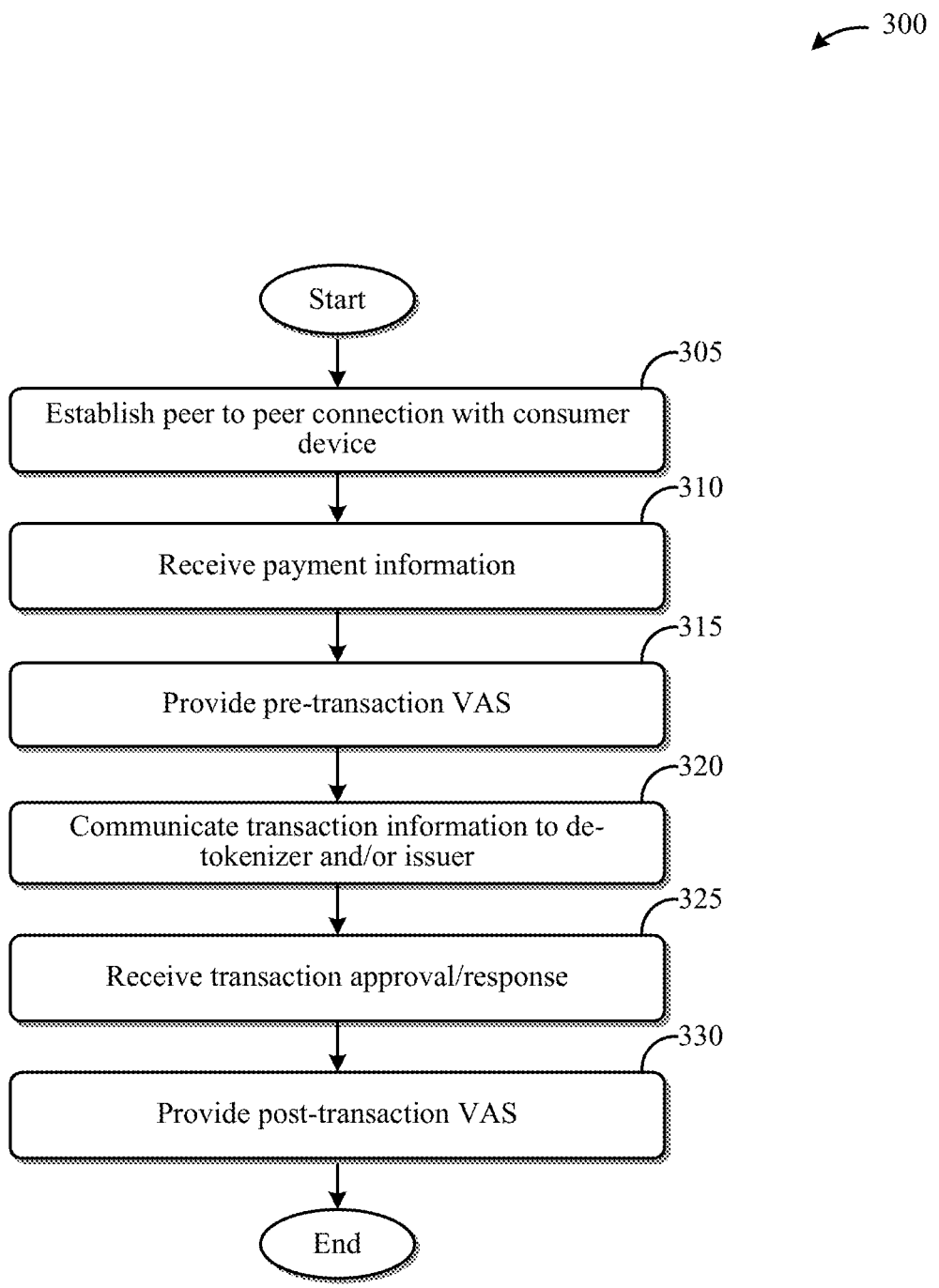

FIG. 3 illustrates a flow diagram of an example process 300 for receiving information via a peer-to-peer communications session and completing a payment transaction based at least in part upon the received information. In certain embodiments, the operations of the method 300 may be performed by a suitable merchant POS device and/or associated transaction processing application, such as the merchant POS device 110 and/or the transaction processing application 157 illustrated in FIG. 1. The method 300 may begin at block 305.

At block 305, a peer-to-peer connection may be established with a consumer device, such as the consumer device 105 illustrated in FIG. 1. For example, a peer-to-peer connection may be established in accordance with the ISO 18092 standard. Additionally, a wide variety of payment and/or transaction-related information, such as tokenized information (e.g., token/credential data, tokenized payment account information, tokenized VAS information, etc.), may then be received at block 310 via the peer-to-peer connection. Once information is received, the information may be processed in order to identify relevant transaction-related data. In certain embodiments, a de-tokenization service provider may be invoked in order to facilitate the decoding and/or decryption of tokenized information and, as desired, the receipt of information referenced by tokenized information. For example, tokenized transaction-related information (e.g., a token and/or credential, etc) may be communicated to a de-tokenization service provider, and information associated with the tokenized information (e.g., decrypted information, information referenced by the tokenized information, etc.) may optionally be returned by the de-tokenization service provider. In other embodiments, the de-tokenization service provider may facilitate the completion of various services utilizing the tokenized information and/or communicate de-tokenized information and/or associated instructions to one or more other entities (e.g., a service provider system, etc.) to facilitate at least a portion of the various services.

At block 305, the merchant POS device 110 may process a transaction utilizing a wide variety of received information. A wide variety of suitable operations may be performed by the merchant POS device to process the transaction. For example, at block 315, the merchant POS device may provide a wide variety of pre-transaction VAS by communicating any number of VAS requests to one or more suitable service provider systems. At block 320, transaction information may be communicated to a de-tokenization system and/or an issuer system, and any number of responses may be received at block 325, such as de-tokenized information and/or an approval for the payment transaction. For example, tokenized information may be communicated to a de-tokenization system for evaluation and/or to an issuer system along with a transaction approval request. In certain embodiments, de-tokenization information may be received and utilized to further process the transaction. As desired, the de-tokenization information may be received prior to performing the pre-transaction VAS described above. Additionally, at block 330, the merchant POS device 110 may request the provision of a wide variety of suitable post-transaction VAS. For example, the merchant POS device 110 may communicate any number of VAS requests to one or more suitable service provider systems. The method 300 may end following block 330.

The operations described and shown in the methods 200, 300, of FIGS. 2-3 may be carried out or performed in any suitable order as desired in various embodiments of the disclosure. Additionally, in certain embodiments, at least a portion of the operations may be carried out in parallel. Furthermore, in certain embodiments, less than or more than the operations described in FIGS. 2-3 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. One or more computer-readable media configured to store computer-executable instructions that, responsive to execution by one or more processors, cause operations to be performed comprising:

receiving a first transaction request;

determining that tokenization service access to a secure element of a mobile communication device is available for the first transaction request, the secure element is a first hardware chip separated from a second hardware chip of the mobile device, the first hardware chip configured to communicate with the second hardware chip, and the second hardware chip configured to invoke a peer-to-peer protocol for peer-to-peer communication between the consumer device and a merchant device;

transmitting a first request to the secure element for tokenization of data of the first transaction request;

determining, by the secure element, a first tokenization information associated with a first payment transaction for the first transaction request, wherein the first tokenized information comprises a payment credential, payment-related data, and value added service (VAS) information, wherein the VAS information consists of:

information associated with an application of coupons, wherein the information associated with the application of coupons identifies one or more coupons that may be redeemed in association with the first transaction request, information associated with loyalty awards, wherein the information associated with the loyalty awards facilitates the issuance of loyalty points in association with the first transaction request,
information associated with delivery services, and
information associated with product registration services;
receiving, by the mobile device, the first tokenized information from the secure element in response to the first request;
establishing, by the second hardware chip, a first peer-to-peer communication session with a first payment recipient device and the mobile device;
communicating, by the mobile device, the first tokenized information to the first payment recipient device via the first peer-to-peer communication session to facilitate completion of the first payment transaction;
receiving, by the mobile device, a second transaction request;
determining, by the mobile device, that the tokenization service access to the secure element is not available for the second transaction request;
transmitting, by the mobile device, a second request to a tokenization service provider for the tokenization of data of the second transaction request;
receiving, by the mobile device, a second tokenized information from the tokenization service provider;
establishing, by the second hardware chip, a second peer-to-peer communication session with a second payment recipient device; and
communicating, by the mobile device, the second tokenized information to the second payment recipient device via the second peer-to-peer communication session to facilitate completion of the second payment transaction.

2. The one or more computer-readable media of claim 1, wherein the first peer-to-peer communication session utilizes the peer-to-peer protocol.

3. The one or more computer-readable media of claim 1, the operations further comprising:
verifying an identity of a consumer associated with the mobile device.

4. The one or more computer-readable media of claim 1, wherein the—payment-related data comprises at least one of:
i) identification information for a payment account to be utilized in association with the payment transactions;
ii) consumer identification information to identify the payment account; or
iii) consumer device identification information to identify the payment account.

5. The one or more computer-readable media of claim 1, wherein the VAS information further comprises at least one of:
data associated with a pre-transaction VAS; or
data associated with a post-transaction VAS.

6. The one or more computer-readable media of claim 1, the operations further comprising:
evaluating the mobile device location based at least in part on consumer transaction processing preferences; and
determining whether the payment transaction can be completed based at least in part on the evaluation;
in response to determining the payment transaction can be completed, completing the payment transaction; and
in response to determining the payment transaction cannot be completed, aborting the payment transaction.

7. The one or more computer-readable media of claim 1, the operations further comprising:
generating an electronic receipt corresponding to the payment transaction; and
transmitting the electronic receipt to one or more devices based at least in part on consumer preferences.

8. A computer-implemented method, comprising:
receiving, by a consumer device comprising at least one processor, a first transaction request;
determining, by the consumer device, that tokenization service access to a secure element of the consumer device is available for the first transaction request,
wherein the secure element is a first hardware chip separated from a second hardware chip of the consumer device, the first hardware chip configured to communicate with the second hardware chip, and the second hardware chip configured to invoke a peer-to-peer protocol for peer-to-peer communication between the consumer device and a merchant device;
transmitting, by the consumer device, a first request to the secure element for tokenization of data of the first transaction request;
determining, by the secure element, a first tokenization information associated with a first payment transaction for the first transaction request, wherein the first tokenized information comprises a payment credential, payment-related data, and value added service (VAS) information, wherein the VAS information consists of:
information associated with an application of coupons, wherein the information associated with the application of coupons identifies one or more coupons that may be redeemed in association with the first transaction request,
information associated with loyalty awards, wherein the information associated with the loyalty awards facilitates the issuance of loyalty points in association with the first transaction request,
information associated with delivery services, and
information associated with product registration services;
receiving, by the consumer device, the first tokenized information from the secure element in response to the first request;
establishing, by the second hardware chip, a first peer-to-peer communication session with a first payment recipient device and the consumer device;
communicating, by the consumer device, the first tokenized information to the first payment recipient device via the first peer-to-peer communication session to facilitate completion of the first payment transaction;
receiving, by the consumer device, a second transaction request;
determining, by the consumer device, the tokenization service access to the secure element is not available for the second transaction request;
transmitting, by the consumer device, a second request to a tokenization service provider for the tokenization of data of the second transaction request;
receiving, by the consumer device, a second tokenized information from the tokenization service provider;
establishing, by the second hardware chip, a second peer-to-peer communication session with a second payment recipient device and the consumer device; and
communicating, by the consumer device, the second tokenized information to the second payment recipient device via the second peer-to-peer communication session to facilitate completion of the second payment transaction.

9. The computer-implemented method of claim 8, wherein the first peer-to-peer communication session utilizes the peer-to-peer protocol.

10. The computer-implemented method of claim 8, further comprising: verifying, by the consumer device, an identity of a consumer associated with the consumer device.

11. The computer-implemented method of claim 8, wherein the payment-related data comprises at least one of:
   i) identification information for a payment account to be utilized in association with the payment transactions;
   ii) consumer identification information to identify the payment account; or
   iii) consumer device identification information to identify the payment account.

12. The computer-implemented method of claim 8, wherein the VAS information further comprises at least one of:
   i) data associated with a pre-transaction VAS; or
   ii) data associated with a post-transaction VAS.

13. The computer-implemented method of claim 8, further comprising:
   evaluating, by the consumer device, a consumer device location based at least in part on consumer transaction processing preferences; and
   determining, by the consumer device, whether the payment transaction can be completed based at least in part on the evaluation;
   in response to determining the payment transaction can be completed, completing, by the consumer device, the payment transaction; and
   in response to determining the payment transaction cannot be completed, aborting, by the consumer device, the payment transaction.

14. The computer-implemented method of claim 8, further comprising:
   generating, by the consumer device, an electronic receipt corresponding to the payment transaction; and
   transmitting, by the consumer device, the electronic receipt to one or more devices based at least in part on consumer preferences.

* * * * *